UNITED STATES PATENT OFFICE.

ALBERT DOMEIER AND OTTO CHRISTIAN HAGEMANN, OF LONDON, ENGLAND, ASSIGNORS TO JAMES S. KIRK & CO., OF CHICAGO, ILLINOIS.

PROCESS OF RECOVERING GLYCERINE FROM SPENT SOAP-LYES.

SPECIFICATION forming part of Letters Patent No. 413,619, dated October 22, 1889.

Application filed March 9, 1889. Serial No. 302,644. (No specimens.)

*To all whom it may concern:*

Be it known that we, ALBERT DOMEIER and OTTO CHRISTIAN HAGEMANN, both of London, England, have invented an Improved Process for Treating Spent Soap-Lyes for the Purpose of Obtaining Glycerine and other Products Therefrom; and we do hereby declare that the following is a full, complete, and exact description of said process.

The objects of this invention are to obtain glycerine and other useful products from soap-lyes.

In carrying out our invention we proceed as follows:

The spent lyes are collected in a suitable tank, whereupon there is added to them a small proportion of hydrated caustic lime, baryta, alumina, or any other earthy or metallic oxide or hydrate, as the hydrates of iron, magnesia, &c., capable of combining with soapy and fatty matters that are contained in the lye. The lime or its above-mentioned equivalents produce an insoluble precipitate, which quickly settles to the bottom of the tank in which the operation is performed, or may be removed by filtration, and thus the lye is purified from a large proportion of the fatty matters it contains. In ordinary cases it will suffice to add about two pounds of lime to about one hundred gallons of the lye; but otherwise we repeat this treatment until the perfect cleansing of the lye is obtained. We ascertain this by placing some of the filtered liquor in a bottle, so as only partly to fill same, and then violently shake. If the foam thus formed in the bottle does not rapidly subside, the liquor will require further treatment with the lime or oxides, until upon a fresh trial a rapid collapsing of the foam takes place. We next boil the lye down to the "salting-point"—that is to say, we concentrate it until it is saturated with salt. The lye is then removed to another vessel and hydrochloric or other suitable acid added thereto till the liquor possesses a neutral reaction. In this state albuminous bodies separate. We now further add sulphate of iron or manganese or zinc or alumina for the purpose and to the extent of decomposing by double decomposition soapy bodies present. For control we filter a sample of the liquor and add an acid in excess. If upon standing no turbidity or haziness is observed to set in, then the fatty matters are sufficiently fixed through the action of the metal salts. Following this treatment we mix with the liquor metallic oxides, as the oxide of iron, manganese, and chromium, and keep the mixture well stirred for some time. The oxides cause the removal of fatty bodies, the acids and metallic salts of which are more or less soluble, as capronates, caprylates, laurinates, and others. We thus promote the formation of basic salts, which are practically insoluble.

In most cases we effect all action on the fatty bodies in one operation, using a mixture of metallic salts and of oxides simultaneously.

We do not limit ourselves to the metallic salts and oxides mentioned, but may employ such other metallic salts and oxides as are suitable for the purpose set forth.

The liquor after separation from the precipitates is then concentrated to evaporate more water, causing the salt which is carried in the lye to crystallize. This salt may be washed and used again in the manufacture of soap. Finally, we evaporate the liquor to the concentration of crude glycerine.

In many instances the first operation—namely, that of adding lime or oxides to the raw lye—is not essential, as the treatment with the metal salts and oxides in the operations last described will be sufficient to eliminate the soapy matter; but this would cause more expense. We also may dispense with the concentrating to salting-point previous to applying the treatment as described hereinbefore to follow such preliminary concentration of the liquor, or we may go further in concentrating previous to such treatments.

In case an excess of the metallic salts had been employed such excess may be precipitated out by a suitable alkali before the final concentration.

What we claim as our invention is—

1. In the process of treating spent soap-lye for the purpose of obtaining glycerine and other products therefrom, the improvement which consists in first treating the lye with lime or other oxides to precipitate insoluble soaps, removing the precipitate thus formed, next neutralizing the lye with acid to precipitate albuminous bodies, then adding soluble metallic salts to decompose any remaining soapy matters, next adding metallic oxides to completely remove fatty bodies, then removing the precipitates, and finally concentrating the clear liquor, as set forth.

2. In the process of treating spent soap-lye for the purpose of obtaining glycerine and other products therefrom, the improvement which consists in first treating the lye with lime or other oxides to precipitate soaps, removing the precipitate thus formed, next neutralizing the lye with acid to precipitate albuminous bodies, then adding a mixture of metallic oxides and soluble metallic salts to completely remove soapy and fatty bodies, next removing the precipitates thus formed, and finally concentrating the clear liquor, as set forth.

3. In the process of treating spent soap-lye for the purpose of obtaining glycerine and other products therefrom, the improvement which consists in first neutralizing the lye with acid to precipitate albuminous bodies, then adding soluble metallic salts to decompose the soapy matters, next adding metallic oxides to completely remove fatty bodies, then removing the precipitates, and finally concentrating the clear liquor, as set forth.

4. In the process of treating spent soap-lye for the purpose of obtaining glycerine and other products therefrom, the improvement which consists in first neutralizing the lye with acid to precipitate albuminous bodies, then adding a mixture of metallic oxides and soluble metallic salts to completely precipitate the soapy and fatty bodies, next removing the precipitate thus formed, and finally concentrating the clear liquor, as set forth.

In testimony whereof we have signed our names to this specification, in the presence of the subscribing witnesses, at London, this 22d day of February, 1889.

ALBERT DOMEIER.
OTTO CHRISTIAN HAGEMANN.

Witnesses:
FRANCIS W. FRIEGOET,
A. G. MOSSARD.

It is hereby certified that Letters Patent No. 413,619, granted October 22, 1889, upon the application of Albert Domeier and Otto Christian Hagemann, of London, England, for an improvement in the "Process of Recovering Glycerine from Spent Soap-Lyes," were erroneously issued to James S. Kirk & Co. as sole owners of the invention; that said Letters Patent should have been issued to said *Albert Domeier and James S. Kirk & Co. jointly*, each being owner of one-half interest, as shown by the record of assignments in this Office; and that said Letters Patent should be read with this correction therein that the same may conform to the record of the case in the Patent Office.

Signed, countersigned, and sealed this 5th day of November, A. D. 1889.

[SEAL.]

CYRUS BUSSEY,
*Assistant Secretary of the Interior.*

Countersigned:

C. E. MITCHELL,
*Commissioner of Patents.*